US012672165B2

(12) United States Patent
Li et al.

(10) Patent No.: US 12,672,165 B2
(45) Date of Patent: Jun. 30, 2026

(54) CHANNEL ACCESS METHOD, TERMINAL DEVICE, AND NETWORK DEVICE

(71) Applicant: VIVO MOBILE COMMUNICATION CO., LTD., Dongguan (CN)

(72) Inventors: Gen Li, Dongguan (CN); Lei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 531 days.

(21) Appl. No.: 17/970,553

(22) Filed: Oct. 20, 2022

(65) Prior Publication Data

US 2023/0041005 A1    Feb. 9, 2023

Related U.S. Application Data

(63) Continuation of application No. PCT/CN2021/088364, filed on Apr. 20, 2021.

(30) Foreign Application Priority Data

Apr. 21, 2020    (CN) .......................... 202010320014.7

(51) Int. Cl.
*H04W 74/00*        (2009.01)
*H04W 74/0808*      (2024.01)

(52) U.S. Cl.
CPC ..... *H04W 74/006* (2013.01); *H04W 74/0808* (2013.01)

(58) Field of Classification Search
CPC .......................... H04W 74/006; H04W 74/0808
See application file for complete search history.

(56) References Cited

U.S. PATENT DOCUMENTS

| | | | | |
|---|---|---|---|---|
| 2013/0287043 | A1* | 10/2013 | Nanda | H04W 74/06 |
| | | | | 370/467 |
| 2017/0215082 | A1 | 7/2017 | Hwang et al. | |
| 2017/0280480 | A1 | 9/2017 | Wong et al. | |
| 2018/0115983 | A1 | 4/2018 | Harada et al. | |
| 2019/0373631 | A1* | 12/2019 | Gulati | H04W 74/0816 |
| 2020/0045738 | A1* | 2/2020 | Oh | H04W 72/1263 |
| 2020/0106573 | A1* | 4/2020 | Cirik | H04L 5/0098 |
| 2025/0176027 | A1* | 5/2025 | Baron | H04W 72/569 |

FOREIGN PATENT DOCUMENTS

| | | |
|---|---|---|
| CN | 105636178 A | 6/2016 |
| CN | 106664659 A | 5/2017 |
| CN | 110505026 A | 11/2019 |

(Continued)

OTHER PUBLICATIONS

Extended European Search Report issued in related European Application No. 21792156.8, mailed Aug. 11, 2023, 10 pages.

(Continued)

*Primary Examiner* — Khai M Nguyen
(74) *Attorney, Agent, or Firm* — IPX PLLC

(57)        ABSTRACT

A channel access method, a terminal device, and a network device are provided. The method includes: monitoring a request to send-downlink control channel according to first configuration information of the request to send-downlink control channel; and determining, according to a monitoring result from monitoring the request to send-downlink control channel, whether to perform channel access.

20 Claims, 5 Drawing Sheets

<u>300</u>

(56) References Cited

FOREIGN PATENT DOCUMENTS

| | | | | | |
|---|---|---|---|---|---|
| CN | 110581754 | A | | 12/2019 | |
| CN | 110831160 | A | | 2/2020 | |
| EP | 3806371 | A1 | * | 4/2021 | ........... H04W 72/23 |
| WO | 2019140060 | A1 | | 7/2019 | |
| WO | 2019237832 | A1 | | 12/2019 | |
| WO | WO-2020060466 | A1 | * | 3/2020 | ........... H04W 72/23 |
| WO | WO-2020063781 | A1 | * | 4/2020 | ........ H04W 74/0816 |

OTHER PUBLICATIONS

TCL Communication, "On Receiver-assisted LBT für NR-U". 3GPP Draft, R1-1811081, Sep. 2018, 2 pages.
NTT Docomo et al, "Channel access procedures for NR-U", 3GPP Draft, R1-1906197, May 2019, 4 pages.
International Search Report issued in corresponding International Application No. PCT/CN2021/088364, mailed Jul. 22, 2021, 6 pages.
Nokia et al., "Feature Lead's Summary on Channel Access Procedures", 3GPP TSG RAN WG1#94bis R1-1811959, Oct. 2018.

* cited by examiner

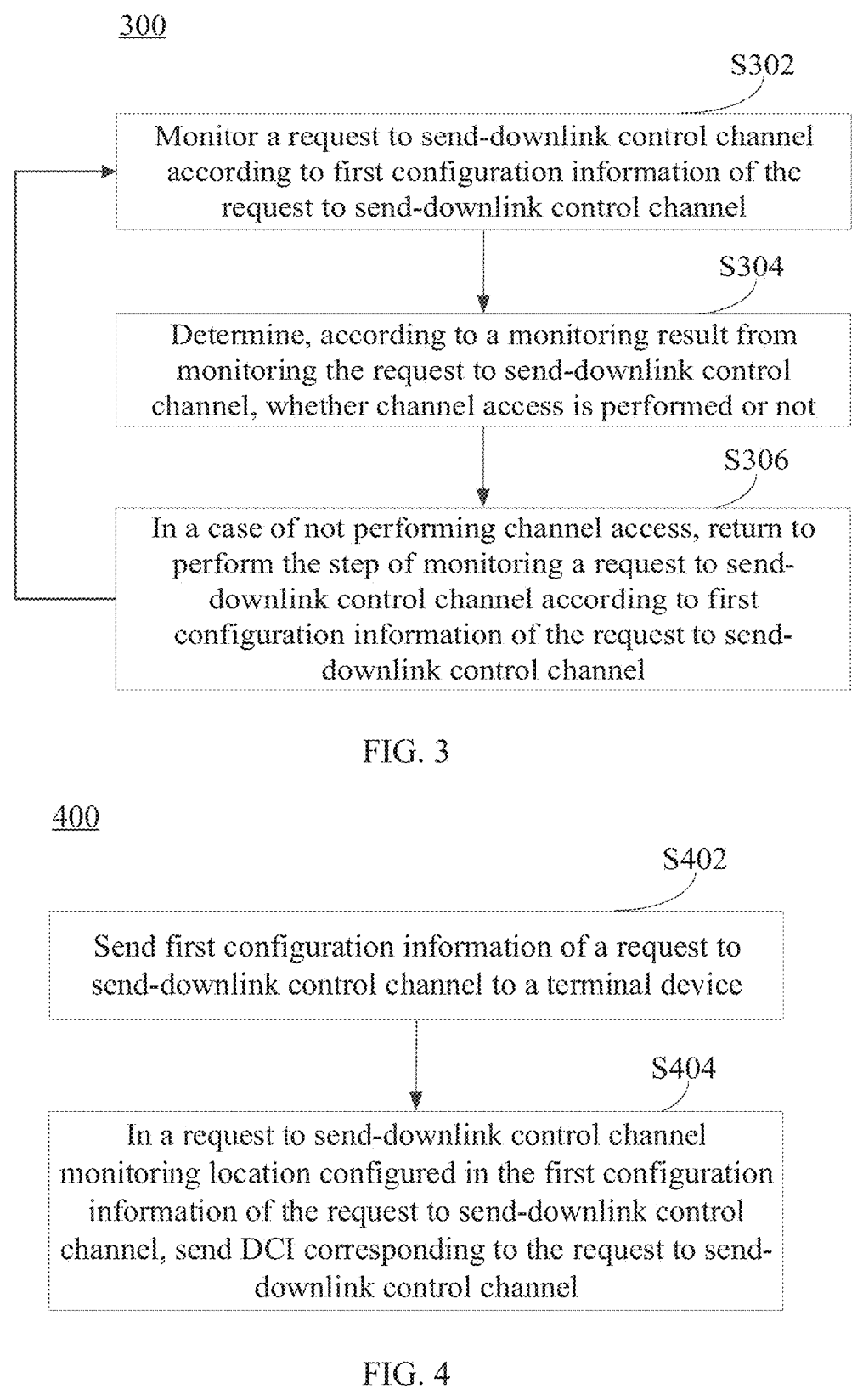

300

S302

Monitor a request to send-downlink control channel according to first configuration information of the request to send-downlink control channel

S304

Determine, according to a monitoring result from monitoring the request to send-downlink control channel, whether channel access is performed or not

S306

In a case of not performing channel access, return to perform the step of monitoring a request to send-downlink control channel according to first configuration information of the request to send-downlink control channel

Send first configuration information of a request to send-downlink control channel to a terminal device

S404

In a request to send-downlink control channel monitoring location configured in the first configuration information of the request to send-downlink control channel, send DCI corresponding to the request to send-downlink control channel

FIG. 4

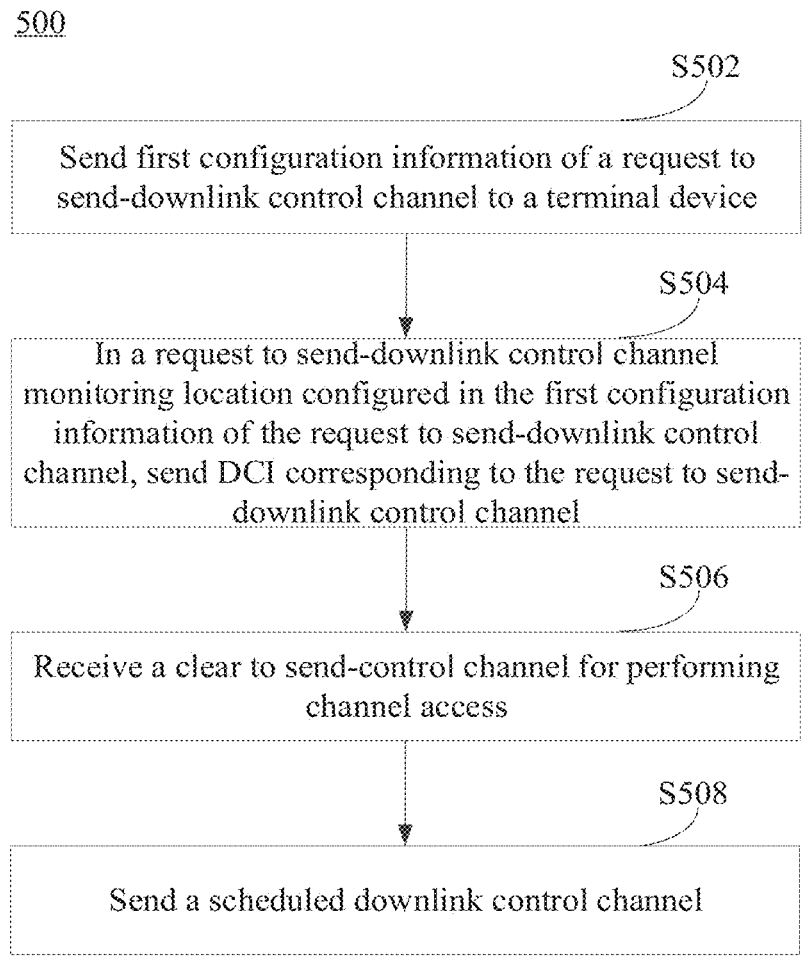

500

S502

Send first configuration information of a request to send-downlink control channel to a terminal device

S504

In a request to send-downlink control channel monitoring location configured in the first configuration information of the request to send-downlink control channel, send DCI corresponding to the request to send-downlink control channel

S506

Receive a clear to send-control channel for performing channel access

S508

Send a scheduled downlink control channel

FIG. 5

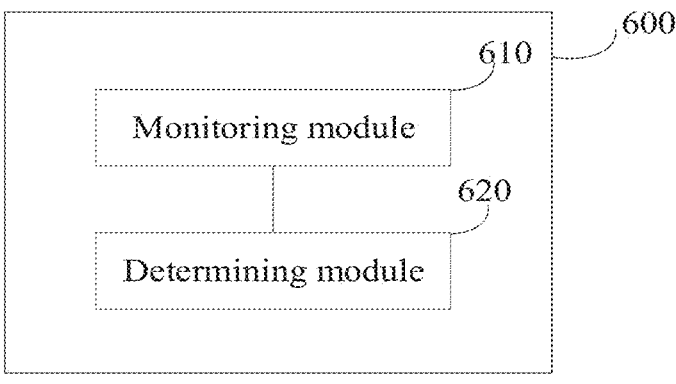

600

610

Monitoring module

620

Determining module

FIG. 6

CHANNEL ACCESS METHOD, TERMINAL DEVICE, AND NETWORK DEVICE

CROSS-REFERENCE TO RELATED APPLICATIONS

This application is a continuation of International Application No. PCT/CN2021/088364, filed Apr. 20, 2021, which claims priority to Chinese Patent Application No. 202010320014.7, filed Apr. 21, 2020. The entire contents of each of the above-referenced applications are expressly incorporated herein by reference.

TECHNICAL FIELD

Embodiments of the present disclosure relates to the communications field, and in particular, to a channel access method, a terminal device, and a network device.

BACKGROUND

In a future communications system, an unlicensed band can be used as a supplement to a licensed band to help an operator expand a service. To keep consistent deployment of the licensed band and the unlicensed band in a New Radio (NR) system and maximize unlicensed access based on the NR system as much as possible, an unlicensed band may work in bands of 5 GHz, 37 GHz, and 60 GHz. A large bandwidth (80 MHz or 100 MHz) of the unlicensed band can reduce the implementation complexity of a base station and a terminal. However, because the unlicensed band is shared by a plurality of Radio Access Technology (RAT), such as wireless fidelity WiFi, a radar, Long Term Evolution License Assisted Access (LTE-LAA), the unlicensed band in use must comply with some rules to ensure that all devices can use a resource fairly. For example, the rules include Listen Before Talk (LBT), a Maximum Channel Occupancy Time (MCOT), and the like.

In the NR system, the LBT can resolve partial channel interference. However, the LBT is initiated by a source node and cannot avoid the problem of a hidden node being present around a destination node.

SUMMARY

Embodiments of the present disclosure are intended to provide a channel access method, a terminal device, and a network device, to avoid the problem of a hidden node being present around a destination node in an NR system.

According to a first aspect, a channel access method is provided, and the method is performed by a terminal device. The method includes: monitoring a request to send-downlink control channel according to first configuration information of the request to send-downlink control channel; and determining, according to a monitoring result from monitoring the request to send-downlink control channel, whether to perform channel access.

According to a second aspect, a channel access method is provided, and the method is performed by a network device. The method includes: sending first configuration information of a request to send-downlink control channel.

According to a third aspect, a terminal device is provided. The terminal device includes: a monitoring module, configured to monitor a request to send-downlink control channel according to first configuration information of the request to send-downlink control channel; and a determining module, configured to determine, according to a monitoring result from monitoring the request to send-downlink control channel, whether to perform channel access.

According to a fourth aspect, a network device is provided. The network device includes: a processing module, configured to send first configuration information of a request to send-downlink control channel.

According to a fifth aspect, a terminal device is provided. The terminal device includes a processor, a memory, and a program that is stored in the memory and that can be run on the processor. When the program is executed by the processor, steps of the channel access method according to the first aspect are implemented.

According to a sixth aspect, a network device is provided. The network device includes a processor, a memory, and a program that is stored in the memory and that can be run on the processor. When the program is executed by the processor, steps of the channel access method according to the second aspect are implemented.

According to a seventh aspect, a readable storage medium is provided. The readable storage medium stores a program, and when the program is executed by a processor, steps of the channel access method according to the first aspect and/or the second aspect are implemented.

According to the channel access method, the terminal device, and the network device provided in the embodiments of the present disclosure, the request to send-downlink control channel is monitored according to the first configuration information of the request, to send-downlink control channel; and whether to perform channel access is determined according to the monitoring result from monitoring the request to send-downlink control channel, which can avoid the problem of a hidden node being present around a destination node in an NR system, thereby ensuring transmission performance.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 3 is a schematic flowchart of a channel access method according to another embodiment of the present disclosure;

FIG. 4 is a schematic flowchart of a channel access method according to another embodiment of the present disclosure;

FIG. 5 is a schematic flowchart of a channel access method according to another embodiment of the present disclosure;

FIG. 6 is a schematic structural diagram of a terminal device according to an embodiment of the present disclosure;

DETAILED DESCRIPTION

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of the specification indicates at least one of a former one or a latter one.

It should be understood that the technical solutions in the embodiments of the present disclosure may be applied to various communications systems, such as a Long Term Evolution (LTE) system, an LTE Frequency Division Duplex (FDD) system, an LTE Time Division Duplex (TDD) system, a Universal Mobile Telecommunication System (UMTS), or a Worldwide Interoperability for Microwave Access (WiMAX) communications system, a 5G system or a New Radio (NR) system, or a subsequent evolution communications system.

In the embodiments of the present disclosure, a terminal device may include, but is not limited to a Mobile Station (MS), a Mobile Terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), or a computer having a wireless communication function; or the terminal device may be a portable, pocket-sized, handheld, computer built-in, or vehicle-mounted mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems using different radio access technologies, names of devices having a base station function may be different. For example, in an LTE network, the device is referred to as an Evolved NodeB (eNB or eNodeB), and in a 3rd Generation (3G) network, the device is referred to as a NodeB or a network device in the subsequent evolved communications system. However, the terms do not constitute a limitation.

Figure 1:
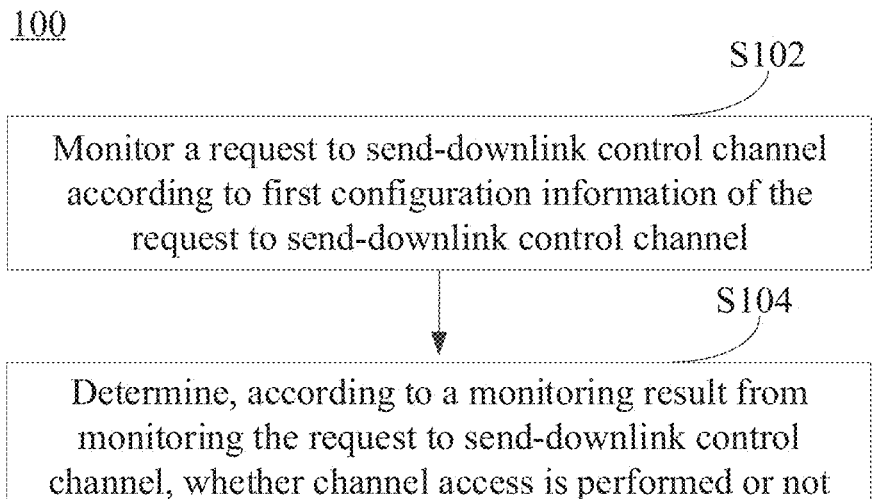
FIG. 1 is a schematic flowchart of a channel access method according to an embodiment of the present disclosure.

As shown in FIG. 1, an embodiment of the present disclosure provides a channel access method 100. The method may be performed by a terminal device. In other words, the method may be performed by software or hardware installed on the terminal device. The method includes the following steps:

S102: Monitor a request to send-downlink control channel according to first configuration information of the request to send-downlink control channel.

In some cases, a network device such as a gNB1 performs LBT before sending data, and it is listened that the channel is idle, so that the gNB1 sends the data to user equipment such as UE1. The UE1 receives the data. In this case, UE2 has data to be sent, and performs LBT first. Because the gNB1 may be far away from the UE2 and the UE1 is in a receiving state, when it is listened that the channel is idle, the UE2 starts to send the data. When a distance between the UE2 and the UE1 is relatively close, the UE1 may receive information sent by the UE2. In this case, the UE2 is a hidden node of the UE1. In this case, the UE1 may be interfered by the hidden node UE2 when receiving the data from the gNB1.

In some cases, for example, when a Request to Send (RTS)/Clear to Send (CTS) mechanism uses a transmission packet designed by the 802.11 protocol, the RTS and/or CTS is composed of a predetermined preamble sequence and a Medium Access Control (MAC) layer. Because its subcarrier spacing, symbol length, Cyclic prefix (CP) length, or the like are quite different from those of an NR system, the RTS and/or the CTS cannot be applied to the NR system.

To avoid a hidden node being present around a destination node in the NR system, this step introduces the RTS/CTS mechanism for the NR system. According to the first configuration information of the RTS-Physical downlink control channel (PDCCH), the RTS-PDCCH is monitored. In some embodiments, the first configuration information of the RTS-PDCCH may be configured by a network device or specified by a protocol.

S104: Determine, according to a monitoring result from monitoring the request to send-downlink control channel, whether to perform channel access.

This step may include: according to the monitoring result from monitoring the RTS-PDCCH, determining to perform channel access for subsequent data transmission, or according to the monitoring result from monitoring the RTS-PDCCH, determining not to perform channel access.

In some embodiments, a source node may send the RTS-PDCCH before data transmission. The RTS carries a network allocation vector (NAV) value and an address of a destination node, which indicates how long the node may occupy the channel. Through this step, a node that receives the RTS-PDCCH will not attempt data transmission within the NAV time. The destination node such as UE replies to a CTS-CCH after receiving the RTS-PDCCH, and the CTS carries an NAV value and an address of the source node. A node that receives the CTS-CCH will not attempt transmission within the NAV time, thereby avoiding a hidden node being present around the destination node.

Therefore, the channel access method provided in this embodiment of the present disclosure monitors the RTS-PDCCH according to the first configuration information of the RTS-PDCCH; and determines, according to the monitoring result from monitoring the RTS-PDCCH, whether to perform channel access, which can implement a request to send/clear to send mechanism in an NR system, avoid transmission interference caused by a hidden node, and ensure transmission performance.

Figure 2:
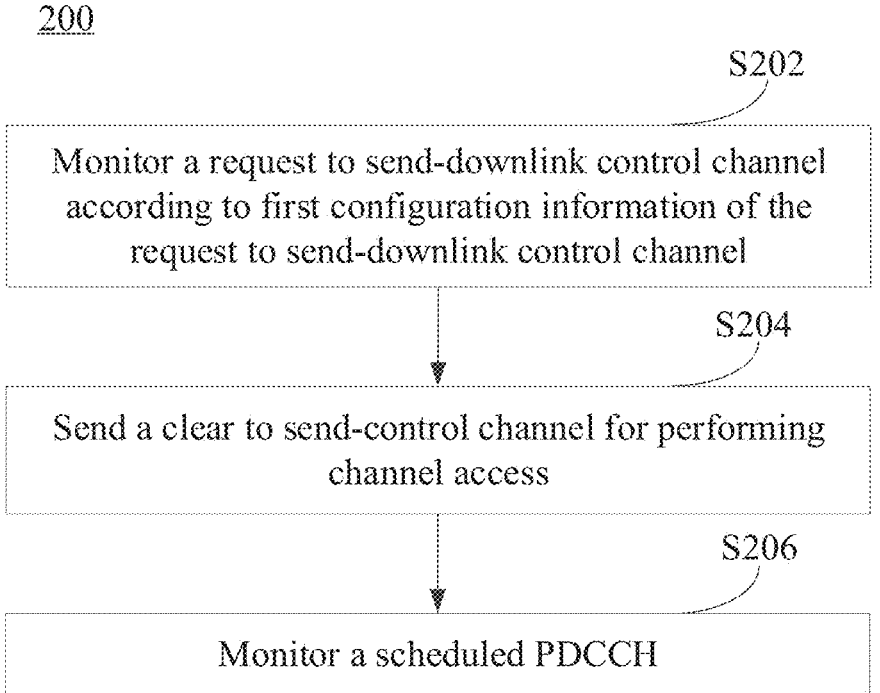
FIG. 2 is a schematic flowchart of a channel access method according to another embodiment of the present disclosure.

As shown in FIG. 2, an embodiment of the present disclosure provides a channel access method 200. The method may be performed by a terminal device. In other words, the method may be performed by software or hardware installed on the terminal device. The method includes the following steps:

S202: Monitor a request to send-downlink control channel according to first configuration information of the request to send-downlink control channel.

This step may use the same or similar descriptions as step S102 in the embodiment of FIG. 1. To avoid repetition, details are not described herein again.

In an implementation manner, the first configuration information of the RTS-PDCCH includes at least one of the following: a Radio Network Temporary identifier (RNTI) corresponding to the RTS-PDCCH transmission, a format that is configured through a search space and is corresponding to the RTS-PDCCH transmission, whether a target function is enabled, or whether the search space configured through the search space is only used for the RTS-PDCCH transmission.

The RNTI corresponding to the RTS-PDCCH transmission may reuse an existing RNTI such as a cell radio RNTI (C-RNTI), a Configured Scheduling RNTI (CS-RNTI), or the like, or may define a new dedicated RTS-RNTI.

The format that is configured through a search space and is corresponding to the RTS-PDCCH transmission may reuse an existing DCI format such as DCI 0_0, DCI 0_1, DCI 1_0, DCI 1_1, or the like, or may define a new DCI format dedicated for RTS transmission.

In an implementation manner, the terminal can only monitor the RTS-PDCCH through protocol pre-definition or base station configuration, that is, only on the search space of the format corresponding to the RTS configured with monitoring transmission, the terminal monitors the above RNTI-scrambled DCI format corresponding to the RTS-PDCCH transmission.

S204: Send a clear to send-control channel for performing channel access.

In an implementation manner, a monitoring result from monitoring the RTS-PDCCH includes: receiving DCI corresponding to the RTS-PDCCH. In some embodiments, the DCI corresponding to the RTS-PDCCH is received and successfully decoded, which indicates that a Cyclic redundancy check (CRC) is successful. The DCI corresponding to the RTS-PDCCH includes at least one of the following: channel occupancy time length, clear to send-control channel (CTS-CCH) resource indication information, monitoring indication information of a scheduled PDCCH, quasi-co-location (QCL) information for a base station obtaining channel usage, or CTS-CCH sending indication information.

The CTS-CCH resource indication information may include: transmission time, a PUCCH Resource Indicator (PRI), or the like. The monitoring indication information of a scheduled PDCCH may include: monitoring time, a search space identifier (ID), or the like. The CTS-CCH sending indication information may include: a format, spatial information, or the like.

In an implementation manner, this step may include at least one of the following processing modes:

Processing mode 1: Perform one or more energy detection-based clear channel assessments (ED based CCA), and send the CTS-CCH for performing channel access when the channel is idle.

Processing mode 2: Perform interference estimation on the RTS-PDCCH transmission, and when a signal-to-noise and interference ratio (SINR) meets a predetermined condition, send the CTS-CCH for performing channel access.

Processing mode 3: According to predefined second configuration information sent by a network device or a CTS-CCH resource indicated by the DCI corresponding to the RTS-PDCCH, send the CTS-CCH for performing channel access.

In some embodiments, when the CTS-CCH is sent according to the processing mode 1 and/or the processing mode 2, a resource for sending the CTS-CCH may be determined through the processing mode 3 and the CTS-CCH is sent on the resource for performing channel access.

In an implementation manner, a time domain location of the RTS-PDCCH is predefined, configured by a network, or determined by a time interval or time offset indicated by the DCI corresponding to the RTS-PDCCH, for example, a predefined or network-configured time interval relative to an end time point of the RTS-PDCCH.

In an implementation manner, a format of the RTS-PDCCH is predefined, configured by a network or indicated by the DCI corresponding to the RTS-PDCCH.

In an implementation manner, spatial information of the CTS-CCH is configured by a network or indicated by the DCI corresponding to the RTS-PDCCH.

S206: Monitor a scheduled PDCCH.

In an implementation manner, a time domain monitoring location of the scheduled PDCCH (S-PDCCH) is determined by at least one of the following: an absolute time domain monitoring location that is configured by a search space of the S-PDCCH, a relative time domain monitoring location that is configured by the search space of the S-PDCCH and is relative to the RTS-PDCCH, or a time offset indicated by the DCI corresponding to the RTS-PDCCH.

In an implementation manner, other configuration information except the time domain monitoring location of the S-PDCCH is configured by a search space where the RTS-PDCCH is located, or is configured by a search space indicated by the DCI corresponding to the RTS-PDCCH.

In addition, after this step, monitoring the RTS-PDCCH may also be stopped within a time interval that is predefined, configured by a base station or indicated by the DCI corresponding to the RTS-PDCCH; and/or monitoring the S-PDCCH is stopped beyond a channel occupancy time length indicated by the DCI corresponding to the RTS-PDCCH.

Therefore, the channel access method provided in this embodiment of the present disclosure monitors the RTS-PDCCH according to the first configuration information of the RTS-PDCCH; and determines, according to the monitoring result from monitoring the RTS-PDCCH, whether to perform channel access, which can implement a request to send/clear to send mechanism in an NR system, avoid transmission interference caused by a hidden node, and ensure transmission performance.

According to the channel access method provided in this embodiment of the present disclosure, the first configuration information of the RTS-PDCCH includes at least one of the following: a radio network temporary identifier corresponding to the RTS-PDCCH transmission, a format that is configured through a search space and is corresponding to the RTS-PDCCH transmission, whether a target function is enabled, or whether the search space configured through the search space is only used for the RTS-PDCCH transmission, which can implement RTS/CTS transmission in an NR system, to avoid transmission interference caused by a hidden node and ensure transmission performance.

According to the channel access method provided in this embodiment of the present disclosure, the sending a CTS-CCH for performing channel access includes at least one of the following processing modes: performing one or more energy detection-based clear channel assessments, and sending the CTS-CCH for performing channel access when the channel is idle; performing interference estimation on the RTS-PDCCH transmission, and when an interference ratio or a signal-to-noise ratio meets a predetermined condition, sending the CTS-CCH for performing channel access; or according to predefined second configuration information sent by a network device or a CTS-CCH resource indicated by the DCI corresponding to the RTS-PDCCH, sending the CTS-CCH for performing channel access. These processing modes can implement RTS/CTS transmission in an NR system, to avoid transmission interference caused by a hidden node and ensure transmission performance.

According to the channel access method provided in this embodiment of the present disclosure, a time domain location of the CTS-CCH is predefined, configured by a network or determined by a time interval or time offset indicated by the DCI corresponding to the RTS-PDCCH; and/or a format of the CTS-CCH is predefined, configured by a network or indicated by the DCI corresponding to the RTS-PDCCH; and/or spatial information of sending the CTS-CCH is configured by a network or indicated by the DCI corresponding to the RTS-PDCCH, which can implement RTS/CTS transmission in an NR system, to avoid transmission interference caused by a hidden node and ensure transmission performance.

According to the channel access method provided in this embodiment of the present disclosure, the time domain monitoring location of the scheduled PDCCH is determined by the absolute time domain monitoring location that is configured by the search space of the scheduled PDCCH, the relative time domain monitoring location that is configured by the search space of the scheduled PDCCH and is relative to the RTS-PDCCH, and the time offset indicated by the DCI corresponding to the RTS-PDCCH; or other configuration information except the time domain monitoring location of the S-PDCCH is configured by a search space where the RTS-PDCCH is located, or is configured by a search space indicated by the DCI corresponding to the RTS-PDCCH, which can implement RTS/CTS transmission in an NR system, to avoid transmission interference caused by a hidden node and ensure transmission performance.

According to the channel access method provided in this embodiment of the present disclosure, monitoring the RTS-PDCCH is stopped within a time interval that is predefined, configured by a base station or indicated by the DCI corresponding to the RTS-PDCCH; and/or monitoring the scheduled PDCCH is stopped beyond a channel occupancy time length indicated by the DCI corresponding to the RTS-PDCCH, which can save monitoring resources.

As shown in FIG. 3, an embodiment of the present disclosure provides a channel access method 300. The method may be performed by a terminal device. In other words, the method may be performed by software or hardware installed on the terminal device. The method includes the following steps:

S302: Monitor a request to send-downlink control channel according to first configuration information of the request to send-downlink control channel.

This step may use the same or similar descriptions as step S102 in the embodiment of FIG. 1 and step S202 in the embodiment of FIG. 2. To avoid repetition, details are not described herein again.

S304: Determine, according to a monitoring result from monitoring the request to send-downlink control channel, whether to perform channel access.

This step may use the same or similar descriptions as step S104 in the embodiment of FIG. 1. To avoid repetition, details are not described herein again.

S306: In a case of not performing channel access, return to perform the step of monitoring a request to send-downlink control channel according to first configuration information of the request to send-downlink control channel.

That is, return to step S302.

Therefore, the channel access method provided in this embodiment of the present disclosure monitors the RTS-PDCCH according to the first configuration information of the RTS-PDCCH; and determines, according to the monitoring result from monitoring the RTS-PDCCH, whether to perform channel access, which can implement a request to send/clear to send mechanism in an NR system, avoid transmission interference caused by a hidden node, and ensure transmission performance.

The channel access method according to this embodiment of the present disclosure is described in detail above with reference to FIG. 1. A channel access method according to another embodiment of the present disclosure is described in detail below with reference to FIG. 4. It may be understood that interaction between a network device and a terminal device described on the network device side is the same as that described on the terminal device side in the method shown in FIG. 1. To avoid repetition, relevant descriptions are appropriately omitted.

FIG. 4 is a schematic flowchart of implementing a channel access method according to an embodiment of the present disclosure. The method may be performed by a network device side, and the network device may be a base station. As shown in FIG. 4, the method 400 includes the following steps:

S402: Send first configuration information of a request to send-downlink control channel to a terminal device.

In an implementation manner, the first configuration information of the RTS-PDCCH includes at least one of the following: an RNTI corresponding to the RTS-PDCCH transmission, a format that is configured through a search space and is corresponding to the RTS-PDCCH transmission, whether a target function is enabled, and whether the search space configured through the search space is only used for the RTS-PDCCH transmission.

S404: In a request to send-downlink control channel monitoring location configured in the first configuration information of the request to send-downlink control channel, send DCI corresponding to the request to send-downlink control channel.

In an implementation manner, the DCI corresponding to the RTS-PDCCH includes at least one of the following: channel occupancy time length, CTS-CCH resource indication information, monitoring indication information of a scheduled PDCCH, QCL information for a base station obtaining channel usage, or CTS-CCH sending indication information.

In an implementation manner, before this step, the method further includes: performing LBT, and when the LBT is successful, sending the DCI corresponding to the RTS-PDCCH.

Therefore, through sending the first configuration information of the RTS-PDCCH, the channel access method provided in this embodiment of the present disclosure can implement a request to send/clear to send mechanism in an NR system, avoid transmission interference caused by a hidden node, and ensure transmission performance.

FIG. 5 is a schematic flowchart of implementing a channel access method according to an embodiment of the present disclosure. The method may be performed by a network device, and the network device may be a base station. As shown in FIG. 5, the method 500 includes the following steps.

S502: Send first configuration information of a request to send-downlink control channel to a terminal device.

S504: In a request to send-downlink control channel monitoring location configured in the first configuration information of the request to send-downlink control channel, send DCI corresponding to the request to send-downlink control channel.

The above steps may be similar to steps S402 to S404 in the embodiment of FIG. 4, and will not be described herein again.

S506: Receive a clear to send-control channel for performing channel access.

In an implementation manner, the CTS-CCH may be received on predefined second configuration information sent by a network device or a CTS-CCH resource indicated by the DCI corresponding to the RTS-PDCCH.

In an implementation manner, a time domain location of the CTS-CCH is predefined, configured by a network or determined by a time interval or time offset indicated by the DCI corresponding to the RTS-PDCCH.

In an implementation manner, a format of the CTS-CCH is predefined, configured by a network or indicated by the DCI corresponding to the RTS-PDCCH.

In an implementation manner, spatial information of sending the CTS-CCH is configured by a network or indicated by the DCI corresponding to the RTS-PDCCH.

S508: Send a scheduled downlink control channel.

In an implementation manner, a time domain monitoring location of the scheduled downlink control channel is determined by at least one of the following: an absolute time domain monitoring location that is configured by a search space of the scheduled downlink control channel, a relative time domain monitoring location that is configured by the search space of the scheduled downlink control channel and is relative to the RTS-PDCCH, or a time offset indicated by the DCI corresponding to the RTS-PDCCH.

In an implementation manner, other configuration information except the time domain monitoring location of the scheduled downlink control channel is configured by a search space where the RTS-PDCCH is located, or is configured by a search space indicated by the DCI corresponding to the RTS-PDCCH.

In addition, in another implementation manner, in a case that the CTS-CCH is not received, the method further includes: returning to perform the step of sending DCI corresponding to the request to send-downlink control channel in a RTS-PDCCH-downlink control channel monitoring location configured in the first configuration information of the RTS-PDCCH.

From the above descriptions, interaction between a network device and a terminal device described on the network device side is similar to or the same as that described on the terminal device side in the method shown in FIG. 1 to FIG. 3, and a same or corresponding technical effect can be achieved. To avoid repetition, relevant descriptions are appropriately omitted.

FIG. 6 is a schematic structural diagram of a terminal device according to an embodiment of the present disclosure. As shown in FIG. 6, the terminal device 600 includes a monitoring module 610 and a determining module 620.

The monitoring module 610 is configured to monitor an RTS-PDCCH according to first configuration information of the RTS-PDCCH. The determining module 620 is configured to determine, according to a monitoring result from monitoring the RTS-PDCCH, whether to perform channel access.

In an implementation manner, the first configuration information of the RTS-PDCCH includes at least one of the following: a radio network temporary identifier corresponding to the RTS-PDCCH transmission, a format that is configured through a search space and is corresponding to the RTS-PDCCH transmission, whether a target function is enabled, or whether the search space configured through the search space is only used for the RTS-PDCCH transmission.

In an implementation manner, the monitoring result from monitoring the RTS-PDCCH includes: receiving DCI corresponding to the RTS-PDCCH; and the DCI corresponding to the RTS-PDCCH includes at least one of the following: channel occupancy time length, CTS-CCH resource indication information, monitoring indication information of a scheduled downlink control channel, quasi-co-location information for a base station obtaining channel usage, or CTS-CCH sending indication information.

In an implementation manner, the determining module 620 is configured to send a CTS-CCH for performing channel access.

In an implementation manner, the determining module 620 is configured to perform at least one of the following processing modes: performing one or more energy detection-based clear channel assessments, and sending the CTS-CCH for performing channel access when the channel is idle; performing interference estimation on the RTS-PDCCH transmission, and when an interference ratio or a signal-to-noise ratio meets a predetermined condition, sending the CTS-CCH for performing channel access; or according to predefined second configuration information sent by a network device or a CTS-CCH resource indicated by the DCI corresponding to the RTS-PDCCH, sending the CTS-CCH for performing channel access.

In an implementation manner, a time domain location of the CTS-CCH is predefined, configured by a network or determined by a time interval or time offset indicated by the DCI corresponding to the RTS-PDCCH; and/or a format of the CTS-CCH is predefined, configured by a network or indicated by the DCI corresponding to the RTS-PDCCH; and/or spatial information of sending the CTS-CCH is configured by a network or indicated by the DCI corresponding to the RTS-PDCCH.

In an implementation manner, the determining module 620 is configured to monitor, after the CTS-CCH is sent for performing channel access, a scheduled downlink control channel.

In an implementation manner, a time domain monitoring location of the scheduled downlink control channel is determined by at least one of the following: an absolute time domain monitoring location that is configured by a search space of the scheduled downlink control channel, a relative time domain monitoring location that is configured by the search space of the scheduled downlink control channel and is relative to the RTS-PDCCH, or a time offset indicated by the DCI corresponding to the RTS-PDCCH.

In an implementation manner, other configuration information except the time domain monitoring location of the scheduled downlink control channel is configured by a search space where the RTS-PDCCH is located, or is configured by a search space indicated by the DCI corresponding to the RTS-PDCCH.

In an implementation manner, after monitoring the scheduled downlink control channel, the determining module 620 is configured to stop monitoring the RTS-PDCCH within a time interval that is predefined, configured by a base station or indicated by the DCI corresponding to the RTS-PDCCH; and/or to stop monitoring the scheduled downlink control channel beyond a channel occupancy time length indicated by the DCI corresponding to the RTS-PDCCH.

In an implementation manner, in a case of not performing channel access, the monitoring module 610 is configured to return to perform the step of monitoring an RTS-PDCCH according to first configuration information of the RTS-PDCCH.

The terminal device 600 according to this embodiment of the present disclosure may be referenced to the flows corresponding to the methods 100 to 300 according to the embodiments of the present disclosure. Furthermore, each unit/module in the terminal device 600 and the foregoing other operations and/or functions are used to implement corresponding flows of the methods 100 to 300, and the same or equivalent technical effect can be achieved. For brevity, details are not described herein again.

Figure 7:
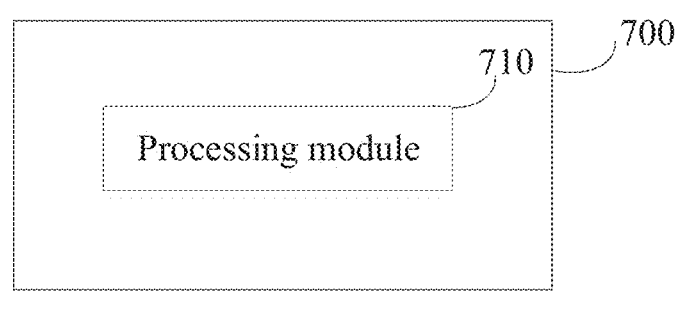
FIG. 7 is a schematic structural diagram of a network device according to an embodiment of the present disclosure.

FIG. 7 is a schematic structural diagram of a network device according to an embodiment of the present disclosure. As shown in FIG. 7, the network device 700 includes a processing module 710.

The processing module 710 is configured to send first configuration information of an RTS-PDCCH.

In an implementation manner, the first configuration information of the RTS-PDCCH includes at least one of the following: a radio network temporary identifier corresponding to the RTS-PDCCH transmission, a format that is configured through a search space and is corresponding to the RTS-PDCCH transmission, whether a target function is enabled, or whether the search space configured through the search space is only used for the RTS-PDCCH transmission.

In an implementation manner, after sending the first configuration information of the RTS-PDCCH, the processing module 710 is configured to send DCI corresponding to the RTS-PDCCH in an RTS-PDCCH monitoring location configured in the first configuration information of the RTS-PDCCH; and the DCI corresponding to the RTS-PDCCH includes at least one of the following: channel occupancy time length, CTS-CCH resource indication information, monitoring indication information of a scheduled downlink control channel, quasi-co-location information for a base station obtaining channel usage, or CTS-CCH sending indication information.

In an implementation manner, before sending the DCI corresponding to the RTS-PDCCH, the processing module 710 is configured to perform listen before talk, and when the listen before talk is successful, send the DCI corresponding to the RTS-PDCCH.

In an implementation manner, after sending the DCI corresponding to the RTS-PDCCH, the processing module 710 is configured to receive a CTS-CCH for performing channel access.

In an implementation manner, the processing module 710 is configured to receive the CTS-CCH on predefined second configuration information sent by a network device or a CTS-CCH resource indicated by the corresponding to the RTS-PDCCH.

In an implementation manner, a time domain location of the CTS-CCH is predefined, configured by a network or determined by a time interval or time offset indicated by the DCI corresponding to the RTS-PDCCH; and/or a format of the CTS-CCH is predefined, configured by a network or indicated by the DCI corresponding to the RTS-PDCCH; and/or spatial information of sending the CTS-CCH is configured by a network or indicated by the DCI corresponding to the RTS-PDCCH.

In an implementation manner, after the CTS-CCH is received for performing channel access, the processing module 710 is configured to send a scheduled downlink control channel.

In an implementation manner, a time domain monitoring location of the scheduled downlink control channel is determined by at least one of the following: an absolute time domain monitoring location that is configured by a search space of the scheduled downlink control channel, a relative time domain monitoring location that is configured by the search space of the scheduled downlink control channel and is relative to the RTS-PDCCH, or a time offset indicated by the DCI corresponding to the RTS-PDCCH.

In an implementation manner, other configuration information except the time domain monitoring location of the scheduled downlink control channel is configured by a search space where the RTS-PDCCH is located, or is configured by a search space indicated by the DCI corresponding to the RTS-PDCCH.

In an implementation manner, in a case that the CTS-CCH is not received, the processing module 710 is configured to return to perform the step of sending the DCI corresponding to the RTS-PDCCH in the RTS-PDCCH monitoring location configured in the first configuration information of the RTS-PDCCH.

The network device 700 according to this embodiment of the present disclosure may be referenced to the flows corresponding to the methods 400 to 500 according to the embodiments of the present disclosure. Furthermore, each unit/module in the network device 700 and the foregoing other operations and/or functions are used to implement corresponding flows of the methods 400 to 500, and the same or equivalent technical effect can be achieved. For brevity, details are not described herein again.

Figure 8:
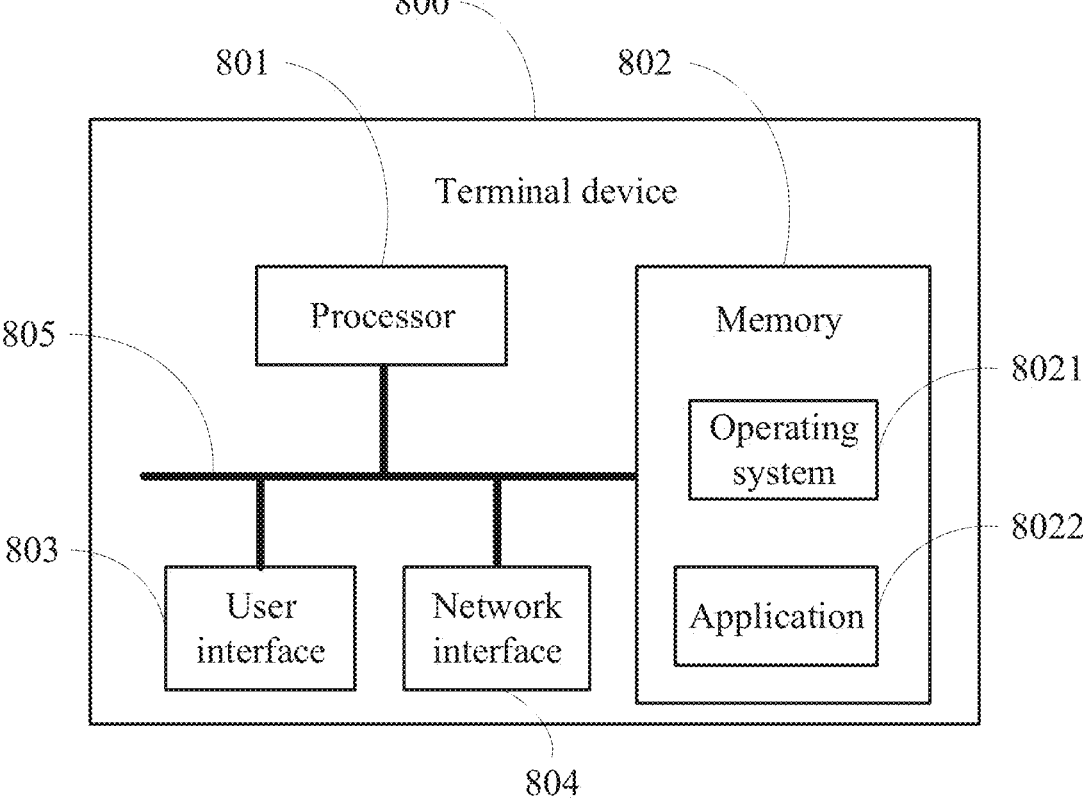
FIG. 8 is a schematic structural diagram of a terminal device according to another embodiment of the present disclosure.

FIG. 8 is a block diagram of a terminal device according to another embodiment of the present disclosure. As shown in FIG. 8, the terminal device 800 includes: at least one processor 801, a memory 802, at least one network interface 804, and a user interface 803. All components in the terminal device 800 are coupled together through a bus system 805. It can be understood that the bus system 805 is configured to implement connection and communication between these components. In addition to a data bus, the bus system 805 further includes a power bus, a control bus, and a status signal bus. However, for clear description, various buses are marked as the bus system 805 in FIG. 8.

The user interface 803 may include a display, a keyboard, a clicking device (for example: a mouse and a trackball), a touch panel, or a touchscreen.

It may be understood that the memory 802 in this embodiment of the present disclosure may be a volatile memory or a non-volatile memory, or may include both a volatile memory and a non-volatile memory. The non-volatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 802 of the system and method described in the embodiments of the present disclosure is intended to include but is not limited to these and any other suitable type of memory.

In some implementation manners, the memory 802 stores the following element, an executable module or a data structure, or a subset thereof, or an extension set thereof: an operating system 8021 and an application program 8022.

The operating system 8021 includes various system programs, for example, a framework layer, a kernel library layer, and a driver layer, and is configured to implement various basic services and process hardware-based tasks. The application program 8022 includes various application programs, such as a media player and a browser, and is configured to implement various application services. A program for implementing the method in this embodiment of the present disclosure may be included in the application program 8022.

In this embodiment of the present disclosure, the terminal device 800 further includes a program that is stored in the memory 802 and that can be run on the processor 801, and when the program is executed by the processor 801, the steps of the methods 100 to 300 are implemented.

The method disclosed in the foregoing embodiment of the present disclosure may be performed by the processor 801, or implemented by the processor 801. The processor 801 may be an integrated circuit chip having a signal processing capability. During implementation, each step of the foregoing method may be completed by using an integrated logic circuit of hardware in the processor 801 or an instruction in a form of software. The processor 801 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the method disclosed with reference to the embodiments of the present disclosure may be directly performed by a hardware decoding processor, or may be performed by using a combination of hardware and software modules in a decoding processor. The software module may be located in a readable storage medium that is mature in the art, such as a random access memory, a flash memory, a read-only memory, a programmable read-only memory, an electrically erasable programmable memory, or a register. The readable storage medium is located in the memory 802. The processor 801 reads information in the memory 802, and completes steps of the foregoing method in combination with hardware of the processor. In some embodiments, the readable storage medium stores a program, and when the program is executed by the processor 801, the steps of the foregoing embodiments of methods 100 to 300 are implemented.

It may be understood that the embodiments described in the embodiments of the present disclosure may be implemented by hardware, software, firmware, middleware, microcode, or a combination thereof. For implementation with hardware, the processing unit can be implemented in one or more Application Specific Integrated Circuits (ASIC), a Digital Signal Processing (DSP), a DSP Device (DSPD), a Programmable Logic Device (PLD), a Field-Programmable Gate Array (FPGA), general processors, controllers, micro-controllers, microprocessors, and another electronic unit for implementing the functions of this application, or their combinations.

For software implementations, the techniques described in embodiments of the present disclosure may be implemented by modules (for example, processes or functions) that perform the functions described in the embodiments of the present disclosure. A software code may be stored in the memory and executed by the processor. The memory may be implemented in the processor or outside the processor.

The terminal device 800 can implement each process implemented by the terminal device in the foregoing embodiments, and the same or equivalent technical effect can be achieved. To avoid repetition, details are not described herein again.

Figure 9:
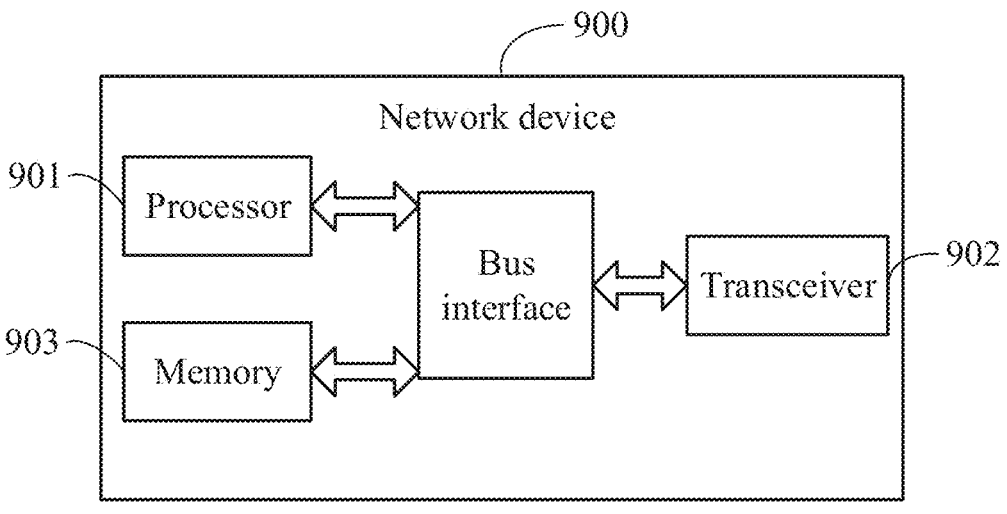
FIG. 9 is a schematic structural diagram of a network device according to another embodiment of the present disclosure.

Referring to FIG. 9, FIG. 9 is a structural diagram of a network device applied in an embodiment of the present disclosure. The network device can implement details of the method embodiment 400-500 and achieve a same effect. As shown in FIG. 9, a network device 900 includes a processor 901, a transceiver 902, a memory 903, and a bus interface.

In this embodiment of the present disclosure, the network device 900 further includes: a program that is stored in the memory 903 and that can be run on the processor 901. When the program is executed by the processor 901, the steps of the method embodiment 400-500 are implemented.

In FIG. 9, a bus architecture may include any quantity of interconnected buses and bridges, and is linked by various circuits of one or more processors represented by the processor 901 and a memory represented by the memory 903. The bus architecture may further link various other circuits such as a peripheral device, a voltage regulator, and a power management circuit together. These are all well-known in the art, and therefore are not further described in this specification. The bus interface provides interfaces. The transceiver 902 may be a plurality of elements, in other words, includes a transmitter and a receiver, and provides a unit configured to communicate with various other apparatuses on a transmission medium.

The processor 901 is responsible for managing the bus architecture and common processing, and the memory 903 may store data used when the processor 901 performs an operation.

The embodiments of the present disclosure further provide a readable storage medium. The readable storage medium stores a program, and when a processor executes the program, the processes of the embodiments of the foregoing methods 100-300 and 400-500 are implemented and the same technical effect can be achieved. To avoid repetition, details are not described herein again. The readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method for channel access in a communication system, performed by a terminal device, comprising:

monitoring a Request to Send Physical Downlink Control Channel (RTS-PDCCH) configured for the communication system, according to first configuration information of the RTS-PDCCH;

determining, according to a monitoring result from monitoring the RTS-PDCCH, whether to perform channel access, wherein the RTS-PDCCH is sent by a source node and indicates duration of Physical Downlink Control Channel (PDCCH) occupancy used by the source node to transmit to the terminal device; and in response to receiving the RTS-PDCCH, sending, by the terminal device, a Clear to Send Control Channel (CTS-CCH) that carries the duration of PDCCH occupancy by the source node so that another node receiving the CTS-CCH does not attempt transmission to the terminal device during the duration of PDCCH occupancy used by the source node.

2. The method according to claim 1, wherein the first configuration information of the RTS-PDCCH comprises at least one of the following:

a radio network temporary identifier corresponding to an RTS-PDCCH transmission;

a format that is configured through a search space and is corresponding to the RTS-PDCCH transmission;

whether a target function is enabled; or whether the search space is only used for the RTS-PDCCH transmission which is configured by the search space.

3. The method according to claim 1, wherein the monitoring result from monitoring the RTS-PDCCH comprises:

receiving downlink control information corresponding to the RTS-PDCCH, wherein the downlink control information corresponding to the RTS-PDCCH comprises at least one of the following:

channel occupancy time length;

clear to send-control channel (CTS-CCH) resource indication information;

monitoring indication information of a scheduled downlink control channel;

quasi-co-location information for a base station obtaining channel usage; or

CTS-CCH sending indication information.

4. The method according to claim 3, wherein the determining, according to a monitoring result from monitoring the RTS-PDCCH, whether to perform channel access comprises:

sending a CTS-CCH for performing channel access.

5. The method according to claim 4, wherein the sending a CTS-CCH for performing channel access comprises at least one of the following processing modes:

performing one or more energy detection-based clear channel assessments, and sending the CTS-CCH for performing channel access when the channel is idle;

performing interference estimation on the RTS-PDCCH transmission, and when an interference ratio or a signal-to-noise ratio meets a predetermined condition, sending the CTS-CCH for performing channel access; or according to predefined second configuration information sent by a network device or a CTS-CCH resource indicated by the downlink control information corresponding to the RTS-PDCCH, sending the CTS-CCH for performing channel access.

6. The method according to claim 4, wherein:

a time domain location of the CTS-CCH is predefined, configured by a network, or determined by a time interval or time offset indicated by the downlink control information corresponding to the RTS-PDCCH;

a format of the CTS-CCH is predefined, configured by a network, or indicated by the downlink control information corresponding to the RTS-PDCCH; or spatial information of sending the CTS-CCH is configured by a network or indicated by the downlink control information corresponding to the RTS-PDCCH.

7. The method according to claim 4, wherein after the sending a CTS-CCH for performing channel access, the method further comprises:

monitoring a scheduled downlink control channel.

8. The method according to claim 7, wherein a time domain monitoring location of the scheduled downlink control channel is determined by at least one of the following:

an absolute time domain monitoring location that is configured by a search space of the scheduled downlink control channel, a relative time domain monitoring location that is configured by the search space of the scheduled downlink control channel and is relative to the RTS-PDCCH, and a time offset indicated by the downlink control information corresponding to the RTS-PDCCH.

9. The method according to claim 7, wherein other configuration information except for the time domain monitoring location of the scheduled downlink control channel is configured by a search space where the RTS-PDCCH is located, or is configured by a search space indicated by the downlink control information corresponding to the RTS-PDCCH.

10. The method according to claim 7, wherein after the monitoring a scheduled downlink control channel, the method further comprises:

stopping monitoring the RTS-PDCCH within a time interval that is predefined, configured by a base station, or indicated by the downlink control information corresponding to the RTS-PDCCH; or stopping monitoring the scheduled downlink control channel beyond a channel occupancy time length indicated by the downlink control information corresponding to the RTS-PDCCH.

11. The method according to claim 1, the method further comprises:

determining not to perform the channel access; and returning to perform the step of monitoring an RTS-PDCCH according to first configuration information of the RTS-PDCCH.

12. A terminal device, comprising:

a memory storing a computer program; and a processor coupled to the memory and configured to execute the computer program to perform operations comprising:

monitoring a Request to Send Physical Downlink Control Channel (RTS-PDCCH) configured for a communication system, according to first configuration information of the RTS-PDCCH;

determining, according to a monitoring result from monitoring the RTS-PDCCH, whether to perform channel access, wherein the RTS-PDCCH is sent by a source node and indicates duration of Physical Downlink Control Channel (PDCCH) occupancy used by the source node to transmit to the terminal device; and in response to receiving the RTS-PDCCH, sending, by the terminal device, a Clear to Send Control Channel (CTS-CCH) that carries the duration of PDCCH occupancy by the source node so that another node receiving the CTS-CCH does not attempt transmission to the terminal device during the duration of PDCCH occupancy used by the source node.

13. The terminal device according to claim 12, wherein the first configuration information of the RTS-PDCCH comprises at least one of the following:

a radio network temporary identifier corresponding to an RTS-PDCCH transmission;

a format that is configured through a search space and is corresponding to the RTS-PDCCH transmission;

whether a target function is enabled; or whether the search space is only used for the RTS-PDCCH transmission which is configured by the search space.

14. The terminal device according to claim 12, wherein the monitoring result from monitoring the RTS-PDCCH comprises:

receiving downlink control information corresponding to the RTS-PDCCH, wherein the downlink control information corresponding to the RTS-PDCCH comprises at least one of the following:

channel occupancy time length;

clear to send-control channel (CTS-CCH) resource indication information;

monitoring indication information of a scheduled downlink control channel;

quasi-co-location information for a base station obtaining channel usage; or

CTS-CCH sending indication information.

15. The terminal device according to claim 14, wherein the determining, according to a monitoring result from monitoring the RTS-PDCCH, whether to perform channel access comprises:

sending a CTS-CCH for performing channel access.

16. A network device, comprising:

a memory storing a computer program; and a processor coupled to the memory and configured to execute the computer program to perform operations comprising:

sending first configuration information of a Request to Send Physical Downlink Control Channel (RTS-PDCCH) configured for a communication system, wherein the first configuration information is used by a terminal device to:

monitor the RTS-PDCCH;

determine whether to perform channel access according to a monitoring result from monitoring the RTS-PDCCH, wherein the RTS-PDCCH indicates duration of Physical Downlink Control Channel (PDCCH) occupancy used by the network device to transmit to the terminal device; and in response to receiving the RTS-PDCCH, send a Clear to Send Control Channel (CTS-CCH) that carries the duration of PDCCH occupancy by the source node so that another node receiving the CTS-CCH does not attempt transmission to the terminal device during the duration of PDCCH occupancy used by the source node.

17. The network device according to claim 16, wherein the first configuration information of the RTS-PDCCH comprises at least one of the following:

a radio network temporary identifier corresponding to an RTS-PDCCH transmission;

a format that is configured through a search space and is corresponding to the RTS-PDCCH transmission;

whether a target function is enabled; or whether the search space is only used for the RTS-PDCCH transmission which is configured by the search space.

18. The network device according to claim 16, wherein after sending the first configuration information of the RTS-PDCCH, the operations further comprise:

in an RTS-PDCCH monitoring location configured in the first configuration information of the RTS-PDCCH, sending downlink control information corresponding to the RTS-PDCCH, wherein the downlink control information corresponding to the RTS-PDCCH comprises at least one of the following:

channel occupancy time length;

clear to send-control channel (CTS-CCH) resource indication information;

monitoring indication information of a scheduled downlink control channel;

quasi-co-location information for a base station obtaining channel usage; or

CTS-CCH sending indication information.

19. The network device according to claim 18, wherein a time domain location of the CTS-CCH is predefined, configured by a network, or determined by a time interval or time offset indicated by the downlink control information corresponding to the RTS-PDCCH; or a format of the CTS-CCH is predefined, configured by a network, or indicated by the downlink control information corresponding to the RTS-PDCCH; or spatial information of sending the CTS-CCH is configured by a network or indicated by the downlink control information corresponding to the RTS-PDCCH.

20. The network device according to claim 18, wherein after the receiving a CTS-CCH for performing channel access, the operations further comprise:

sending a scheduled downlink control channel.

* * * * *